(12) United States Patent
Keil et al.

(10) Patent No.: US 11,403,037 B2
(45) Date of Patent: Aug. 2, 2022

(54) ORDERING MEMORY REQUESTS BASED ON ACCESS EFFICIENCY

(71) Applicant: Apple Inc., Cupertino, CA (US)

(72) Inventors: Shane J. Keil, San Jose, CA (US); Gregory S. Mathews, Saratoga, CA (US); Lakshmi Narasimha Murthy Nukala, Pleasanton, CA (US); Thejasvi Magudilu Vijayaraj, San Jose, CA (US); Kai Lun Hsiung, Fremont, CA (US); Yanzhe Liu, Sunnyvale, CA (US); Sukalpa Biswas, Fremont, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 16/896,027

(22) Filed: Jun. 8, 2020

(65) Prior Publication Data

US 2020/0301615 A1 Sep. 24, 2020

Related U.S. Application Data

(63) Continuation of application No. 16/112,624, filed on Aug. 24, 2018, now Pat. No. 10,678,478.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS

| 6,704,821 | B2 | 3/2004 | Scandurra et al. |
| 7,579,683 | B1 * | 8/2009 | Falik .......... G11C 5/02 257/691 |
| 8,510,521 | B2 | 8/2013 | Biswas et al. |
| 10,496,281 | B2 | 12/2019 | Jeong et al. |
| 2005/0172084 | A1 | 8/2005 | Jeddeloh |

(Continued)

OTHER PUBLICATIONS

Jun Pang, Lei Yang, Lei Shi, Tiejun Zhang, Donghui Wang and Chaohuan Hou, "A priority-expression-based burst scheduling of memory reordering access," 2008 International Conference on Embedded Computer Systems: Architectures, Modeling, and Simulation, 2008, pp. 203-209 (Year: 2008).*

(Continued)

*Primary Examiner* — Khoa D Doan
(74) *Attorney, Agent, or Firm* — Kowert, Hood, Munyon, Rankin & Goetzel, P.C.; Scott W. Pape; Dean M. Munyon

(57) ABSTRACT

An apparatus includes a memory circuit and a memory controller circuit. The memory controller circuit may include a write request queue. The memory controller circuit may be configured to receive a memory request to access the memory circuit and determine if the memory request includes a read request or a write request. A received read request may be scheduled for execution, while a received write request may be stored in the write request queue. The memory controller circuit may reorder scheduled memory requests based on achieving a specified memory access efficiency and based on a number of write requests stored in the write request queue.

20 Claims, 9 Drawing Sheets

(56) References Cited

U.S. PATENT DOCUMENTS

| | | | |
|---|---|---|---|
| 2008/0162799 | A1 | 7/2008 | Spry et al. |
| 2011/0276817 | A1 | 11/2011 | Fullerton et al. |
| 2017/0075812 | A1 | 3/2017 | Wu et al. |
| 2017/0300239 | A1 | 10/2017 | Choi |
| 2018/0173462 | A1 | 6/2018 | Choi et al. |
| 2018/0188970 | A1* | 7/2018 | Liu .................. G06F 3/0653 |
| 2019/0303293 | A1* | 10/2019 | Byun ............... G06F 12/0607 |

OTHER PUBLICATIONS

Kun Fang, et al., "Thread-Fair Memory Request Reordering," Dept. of ECE, University of Illinois at Chicago, Jun. 2012, 6 pages.

International Search Report and Written Opinion in PCT Appl. No PCT/US2019/047807 dated Nov. 29, 2019, 11 pages.

Engin Ipek et al., "Self-Optimizing Memory Controllers: A Reinforcement Learning Approach," International Symposium on Computer Architecture, IEEE, Jun. 1, 2008, pp. 39-50.

International Preliminary Report in PCT Appl. No. PCT/US2019/047807 dated Mar. 11, 2021, 7 pages.

\* cited by examiner

ORDERING MEMORY REQUESTS BASED ON ACCESS EFFICIENCY

The present application is a continuation of U.S. application Ser. No. 16/112,624, filed Aug. 24, 2018 (now U.S. Pat. No. 10,678,478); the disclosure of which is incorporated by reference herein in its entirety.

BACKGROUND

Technical Field

Embodiments described herein are related to the field of computing systems, and more particularly to the management of memory requests by a memory controller in a computing system.

Description of the Related Art

Computer systems, including systems-on-a-chip (SoCs), include processors and multiple memory circuits that store software programs or applications, as well as data being operated on by the processors. Such memories may vary in storage capacity as well as access time. In some computing systems, some memory circuits coupled to the processors via a memory controller circuit communicating with the processors via a communication link or other communication network.

During operation, the processors, which may include processor cores, graphics processors, and the like, transmit requests for access to the memory controller via the communication link. The memory controller receives the requests and arbitrates access to the memory circuits for the requests. Upon relaying a particular request from a processor to the memory circuits, the memory controller circuit waits until the memory circuit fulfills the particular request. In order to fulfill the particular request, the memory circuit may send requested data or an acknowledgement signal to the memory controller circuit, which, in turn, relays the data or signal onto the requesting processor.

SUMMARY OF THE EMBODIMENTS

Broadly speaking, a system, an apparatus, and a method are contemplated in which the apparatus includes a memory circuit and a memory controller circuit. The memory controller circuit may include a write request queue. The memory controller circuit may be configured to receive a memory request to access the memory circuit and determine if the memory request includes a read request or a write request. A received read request may be scheduled for execution, while a received write request may be stored in the write request queue. The memory controller circuit may reorder scheduled memory requests based on achieving a specified memory access efficiency and based on a number of write requests stored in the write request queue.

In some implementations, the memory controller circuit may be configured to determine a current memory access efficiency in response to a completion of a read turn and a write turn. A read turn may correspond to an execution of a number of read requests, while a write turn may correspond to an execution of a number write requests. The current memory access efficiency may be determined based on a ratio of clock cycles used to process memory requests to total clock cycles that occurred during the completed read and write turns.

In particular implementations, the memory controller circuit may be configured to modify a number of memory requests to be executed in subsequent read and write turns based on a comparison of the current memory access efficiency to the specified memory access efficiency. In various embodiments, the memory controller circuit may be configured to schedule at least one partial write memory request to be executed between a read turn and a write turn.

In some embodiments, the memory controller circuit may be configured to schedule a subset of write requests included in the write request queue in response to a determination that a number of write requests in the write request queue satisfies a threshold number of requests. In particular implementations, the memory controller circuit may be configured to prioritize read requests over write requests by scheduling the plurality of write requests to be executed subsequent to execution of a number of read requests. In various embodiments, the memory controller circuit may be configured to prioritize a particular write request over a different write request in response to a determination that an amount of data to be stored by the particular write request is larger than an amount of data to be stored by the different write request.

BRIEF DESCRIPTION OF THE DRAWINGS

The following detailed description makes reference to the accompanying drawings, which are now briefly described.

Figure 1:
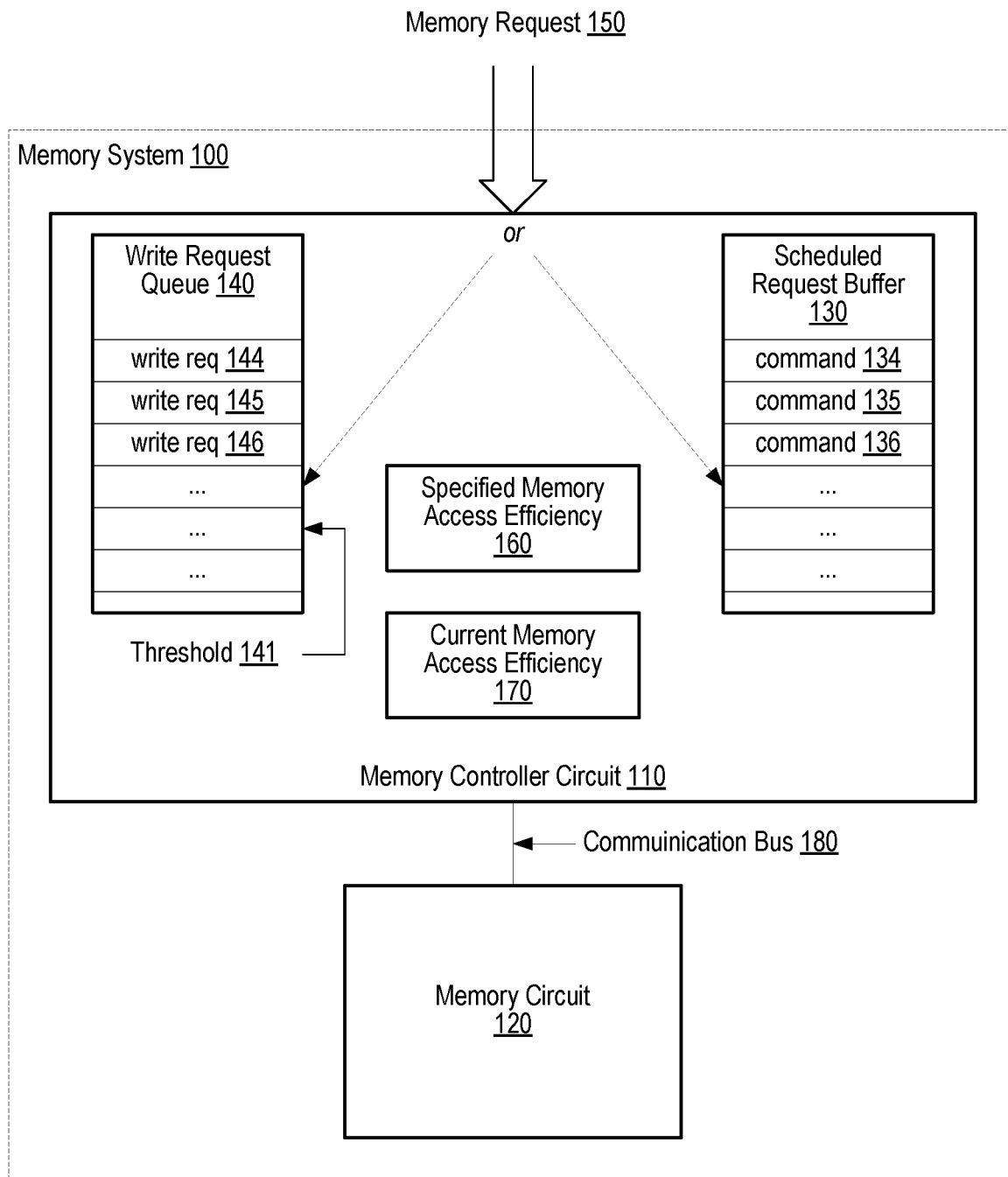
FIG. 1 illustrates a block diagram of an embodiment of a memory system, including a memory controller circuit and a memory circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

In a computer system, a hierarchy of memory circuits are used to store program instructions and data for use by functional circuit blocks within the computer system. Such functional circuit blocks may include processors, processor cores, graphics cores, audio processing circuit, network processing circuits, and the like. Some of the memory circuits, such as cache memory circuits, may be directly coupled to functional circuit blocks in order to provide low-density fast-access dedicated storage for the functional blocks. Other memory circuits are shared between multiple functional circuit blocks to allow the functional circuit blocks access to larger amounts of storage space. To facilitate such sharing of memory circuits, a memory controller circuit may be employed to manage access to the memory circuits.

A memory controller circuit receives requests to access the memory circuits from the functional circuit blocks. Such requests can include requests to retrieve previously stored data from the memory circuits (commonly referred to as "read requests") and requests to stored data in the memory circuits (commonly referred to as "write requests"). In some cases, a read request and a write request may be combined to form a "read-modify-write" request.

As the memory controller circuit receives requests to access the memory circuit, each request is placed in an execution order relative to other received requests in a process referred to as scheduling. The memory controller circuit may determine the execution order according to various criteria. For example, certain types of requests to access the memory may have a higher priority and are therefore placed in the execution order before requests with lower priority. In some cases, scheduling according to the various criteria may result in periods of time during which the memory circuits are not being fully utilized, decreasing the efficiency of the memory sub-system. As used and described herein, memory sub-system "efficiency" refers to any measurement of the utilization of the memory sub-system. One common measure of efficiency is the ratio of active, i.e., non-idle memory cycles to total possible memory cycles occurring in a given amount of time.

Inefficient use of memory circuits in a computer system can adversely affect the performance of a computer system. For example, improperly displayed video can result from video data being retrieved from a memory in an inefficient manner. Additionally, inefficient memory access can result in software or program instructions not being available to a processor or processor core in a timely fashion, thus causing pauses or slow downs in computer system performance. The embodiments illustrated in the drawings and described below may provide techniques for scheduling memory access requests while maintaining a desired efficiency, thereby improving computer system performance.

A block diagram for an embodiment of a memory system, including a memory controller circuit and a memory circuit, is illustrated in FIG. 1. As shown, memory system 100 includes memory controller circuit 110 coupled to memory circuit 120 via communication bus 180. Memory controller circuit 110 further includes scheduled request buffer 130 and write request queue 140. In various embodiments, memory controller circuit 110 and memory circuit 120 may be included on a same integrated circuit or may be implemented in separate integrated circuits. Memory controller circuit 110 may be a particular embodiment of a state machine or other sequential logic circuit, and memory circuit 120 may be any suitable type of memory circuit such as dynamic random-access memory (DRAM), static random-access memory (SRAM), and the like.

As illustrated, memory controller circuit 110 is configured to receive a memory request to access the memory circuit and determine if the memory request includes a read request or a write request. Memory controller circuit 110 is further configured to schedule a received read request for execution or store a received write request in write request queue 140. Additionally, memory controller circuit 110 is configured to reorder scheduled memory requests based on achieving specified memory access efficiency 160, and further based on a number of write requests stored in the write request queue 140.

Memory controller circuit 110, as shown, may generate, based on the read request, one or more memory commands to be sent to memory circuit 120 via communication bus 180. Such commands may be placed into scheduled request buffer 130. In various embodiments, scheduled request buffer 130 may be a particular embodiment of a register file or other suitable storage circuit configured to store commands 134-136. In some cases, memory controller circuit 110 may place the read request, or commands associated with the read request, in a next available entry in scheduled request buffer 130. In other cases, memory controller circuit 110 may compare an address included in memory request 150 and schedule the read request to be executed with other read requests that access information on a same memory page as referenced by the included address.

In the case of write requests, memory controller circuit 110 may continue to store received write requests into write request queue 140 until a number of queued write requests reaches a threshold number, as indicated by threshold 141.

During this time, memory controller circuit 110 may continue to schedule and execute read requests. After the number of queued write requests reaches threshold 141, one or more of the queued write requests, such as, e.g., write requests 144-146, are scheduled by placing the write requests into scheduled request buffer 130 to be executed in a scheduled order.

As described below in more detail, in some embodiments memory controller circuit 110 may determine current memory access efficiency 170 on communication bus 180 after completion of a "read turn" (a series of read memory accesses that does not include a write) and a "write turn" (a series of write memory accesses). When a current memory access efficiency is computed (after completion of a single read turn and a single write turn, or otherwise), this efficiency may then be compared to specified memory access efficiency 160 as part of the reordering process. In various embodiments, specified memory access efficiency 160 may be specified as part of the design of memory system 100, may be determined by hardware based on current processing requirements, or may even be set by software.

As described above, memory controller circuit 110 is coupled to memory circuit 120 via communication bus 180. In various embodiments, communication bus 180 may include a local clock signal, as well as dedicated wires for commands, address and data. Such data wires may be bidirectional, allowing either memory controller circuit 110 or memory circuit 120 to drive data onto the data line. It is noted that memory controller circuit 110 and memory circuit 120 cannot both drive the data lines at the same time. Each time a transition is made from a read operation to write operation (or vice versa) multiple cycles may be required to allow the data line included in communication bus 180 to reach a state where it is possible for a new device to drive the data lines. For example, when switching from a read operation to a write operation, memory controller circuit 110 must wait to start sending data to be written until memory circuit 120 has completed sending data associated with the read operation.

It is noted that memory controller circuit 110 as illustrated in FIG. 1 is merely an example. The illustration of FIG. 1 has been simplified to highlight features relevant to this disclosure. In other embodiments, memory controller circuit 110 may include additional circuit blocks such as interface circuits configured to send and receive data via communication bus 180, for example.

As depicted in FIG. 1, write requests may be stored in a write request queue. Moving to FIG. 2, an embodiment of a memory controller that utilizes a write request queue is shown. Memory controller circuit 210 includes system interface 211, arbitration circuit 212, instruction queue 230, and write request queue 240. Memory controller circuit 210 is coupled to memory circuit 220 via data bus 280 and bus clock 282. Memory circuit 220 includes memory devices 225a-225d, which in turn, include respective pluralities of memory banks 227 and memory pages 229 (shown only for memory device 225a for clarity). In some embodiments, memory controller circuit 210, instruction queue 230, write request queue 240, and memory circuit 220 may correspond to memory controller circuit 110, scheduled request buffer 130, write request queue 140, and memory circuit 120 in FIG. 1. Bus clock 282 and communication bus 280 may collectively correspond to communication bus 180.

Memory circuit 220, as illustrated, includes four memory devices 225a-225d, collectively referred to as memory devices 225. Each of memory devices 225 includes multiple memory banks 227 (for clarity, memory banks 227 and memory pages 229 are only shown for memory device 225a). In various embodiments, the number of banks may be the same or may vary between memory devices 225. For a given one of memory devices 227, different memory banks may be capable of fulfilling memory requests at a same time or in an overlapping sequence. Each memory device 227, however, may be limited to sending or receiving commands, addresses, and data for a single memory request at a time. Each of memory banks 227 includes multiple memory pages 229. It is noted that a "memory page" (also referred to herein as a "page") corresponds to an amount of data that can be accessed from a single memory bank 227 using a single read or write command. In some embodiments, a memory page may correspond to one or more physical rows of memory cells in a memory array. In other embodiments, a memory page may correspond to a different physical or logical organization of memory cells, such as, for example, one or more columns of memory cells, or a number of memory cells that can be addressed with a portion of a memory address value.

Memory controller circuit 210, like memory controller circuit 110, includes circuits for receiving, decoding, scheduling, and executing received memory requests. As shown, system interface 211 receives a memory request to access memory circuit 220 from a processing circuit included in a computing system that includes memory controller 210. Arbitration circuit 212 receives the memory request from system interface 211 and determines if the memory request includes a read request or a write request. Arbitration circuit 212 places a received read request into instruction queue 230. In some embodiments, arbitration circuit 212 may schedule the read request with other read requests with a similar memory address. For example, read requests with memory addresses corresponding to a same memory page 229 may be scheduled together, allowing several read requests to be fulfilled by a single activation of the common memory page 229. As another example, read requests with addresses to different memory banks 227 or to different memory devices 225 may be scheduled together in embodiments in which memory controller circuit 210 can send concurrent requests to different banks or devices.

It is noted, that as used herein, the terms "concurrent" and "parallel" are used to refer to events that may occur during overlapping points in time. The use of "concurrent" or "parallel" is not intended to imply that events begin and end simultaneously, although such occurrences are not ruled out either.

Arbitration circuit 212 places a received write request into write request queue 240. In a computing system in which memory controller circuit 210 might be used, read requests may be prioritized for execution over write requests. Read requests may be issued for data to be used by an active application or process and, therefore, the amount of time for retrieving the data and fulfilling the request may impact the performance of the application or process. In contrast, a write request may include data previously used by the application or process to be used at a later time. In addition, data included in a write request may currently be stored in a cache memory, and as a result, be available for the application or process even if the write request has not been fulfilled.

Communication bus 280, as illustrated, is a combination input/output (I/O) bus, which is used for transferring both read and write data. When switching from a read command to a write command, data associated with read commands is sent from memory circuit 220 to memory controller circuit 210. This data is received by memory controller circuit 210 before the I/O bus is reconfigured to transmit data in the opposite direction for a write command. The opposite is true for switching from a write command to a read command, e.g., data associated with write commands is sent via the I/O bus before any read data can be sent by memory circuit 220.

Switching communication bus 280 back and forth between read and write requests, therefore, results in cycles of bus clock 282 that may not be used for a next memory command due to waiting for completion of a data transfer. These unused clock cycles may cause a reduction of the efficiency of memory controller circuit 210. To achieve a desired efficiency goal, memory controller circuit 210 may adjust a number of read requests processed during a single read turn as well as a number of write requests processed during a single write turn. It is noted that a given read or write turn may include any suitable number of corresponding memory requests, including under some circumstances, zero requests.

As described above, a number of read requests and write requests scheduled for respective read and write turns is determined based on a current memory access efficiency. After a read turn and subsequent write turn have completed, memory controller circuit 210 determines a value for the current memory access efficiency based on a ratio of a number of cycles of bus clock 282 that are used to process memory requests to a total number of cycles of bus clock 282 that occur during the completed read and write turns. Memory controller circuit 210 may then compare the current memory access efficiency to a specified memory access efficiency to determine a current delta from the specified efficiency. Memory controller circuit 210 then reorders scheduled memory requests based on achieving the specified memory access efficiency.

In addition to adjusting the numbers of requests processed during a give turn, memory controller circuit 210 may employ one or more request ordering techniques in order to achieve the specified memory access efficiency. For example, memory controller circuit 210 may modify a number of memory requests to be executed in subsequent read and write turns. Memory controller circuit 210 may schedule at least one partial write memory request (i.e., a read-modify-write request) to be executed between a read turn and a write turn. Another technique includes prioritizing a particular write request over a different write request in response to a determination that an amount of data to be stored by the particular write request is larger than an amount of data to be stored by the different write request. These techniques are described in more detail below.

By prioritizing read requests over write requests, memory controller circuit 210 may store received write requests into write request queue 240, thereby freeing available entries in instruction queue 230 for received read requests. Under some conditions, therefore, a set of read and write turns may include all read requests and no write requests. Such prioritization of read requests may therefore improve performance of active applications or processes by reducing an amount of time between a read request being issued and subsequently being fulfilled.

Figure 2:
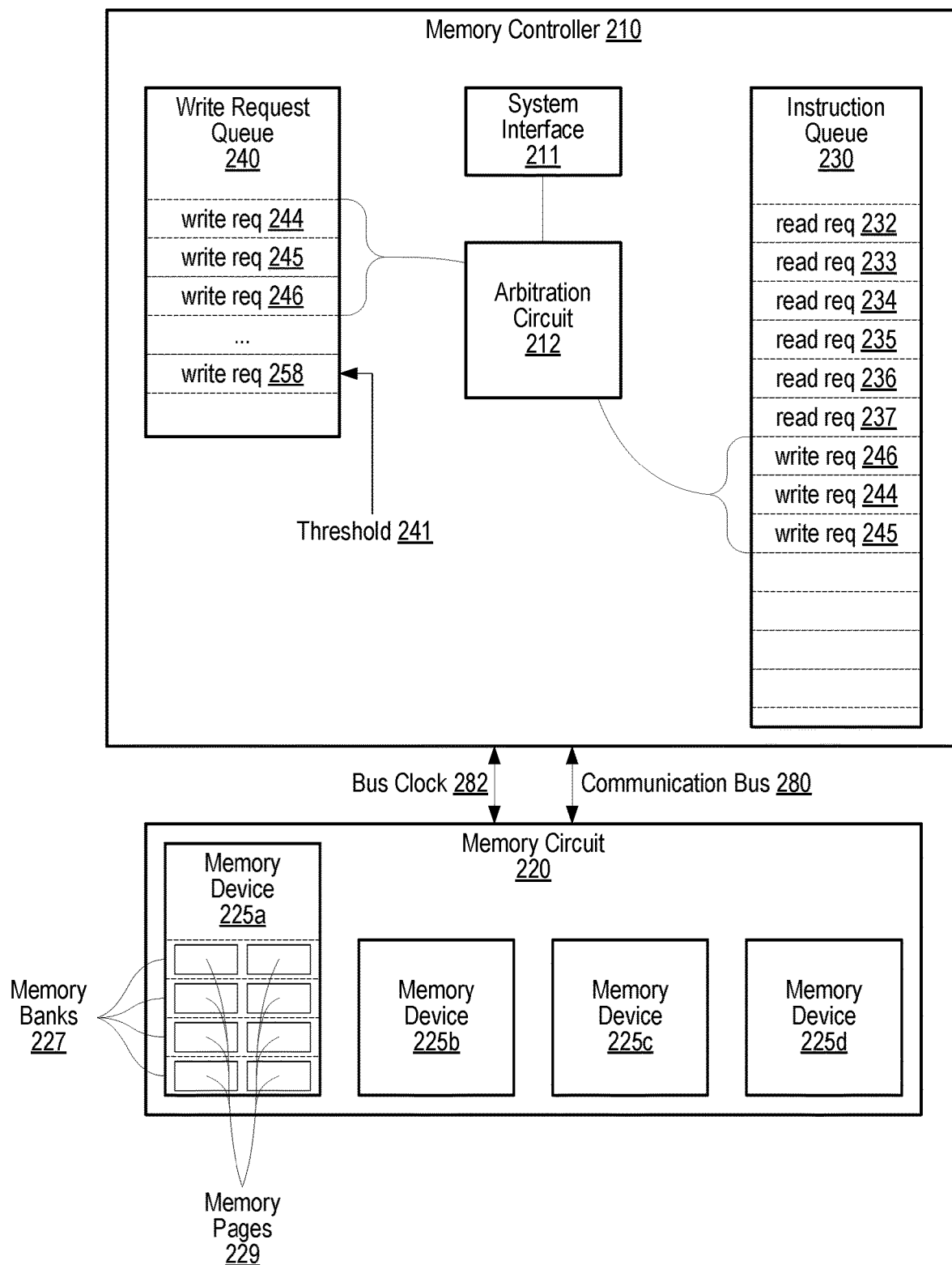
FIG. 2 shows a block diagram of an embodiment of a memory controller circuit and a memory circuit, in which the memory circuit includes multiple memory devices.

Arbitration circuit 212, as illustrated, stores received write requests 244-258 in write requests queue 240. Once a number of queued write requests reaches a threshold number, as indicated by write request 258 and threshold 241, arbitration circuit 212 schedules a subset of the queued write requests by placing the subset into instruction queue 230. As shown in FIG. 2, the subset includes write requests 244-246. In other embodiments, however, any suitable number of write requests may be included in the subset, including all write requests in write requests queue 240. To prioritize read requests, arbitration circuit 212 schedules read requests 232-237 to be executed before write requests 244-246. Read requests 232-237 form a read turn while write requests 244-246 form a write turn. Together the read and write turns form one set of read and write turns, also referred to herein as a memory request turn.

A value for threshold 241 may be set during a design of memory controller circuit 210, or set by software, such as, for example, an operating system executing in a computer system that includes memory controller circuit 210. In some embodiments, the threshold value may be adjusted based on a comparison of the current memory access efficiency to the specified memory access efficiency.

Arbitration circuit 212 may prioritize a particular write request over a different write request in response to a determination that an amount of data to be stored by the particular write request is larger than an amount of data to be stored by the different write request. As shown in instruction queue 230, the write requests are scheduled in the order 246, 244, and then 245. Write request 246, for example, may be a request to store 128 bytes of data to one of memory devices 225. Write requests 244 and 245 may, however, each be requests to store 32 bytes of data, and therefore arbitration circuit 212 schedules these requests after write request 246. Since write requests 244 and 245 are for equivalent amounts of data, arbitration circuit 212 may use other criteria to select an order for these two requests. For example, write request 244 may address locations in a different one of memory devices 225 than memory request 246, and therefore, may be scheduled to be executed concurrently with write request 246. Otherwise, arbitration circuit 212 may schedule write request 244 before write request 245 based on an order in which the two requests are received by memory controller circuit 210.

To execute the memory requests, memory controller circuit 210 sends one or more memory commands corresponding to each request to memory circuit 220. Memory circuit 220 executes the memory commands corresponding to the scheduled read requests and write requests. Memory controller circuit 210 sends memory commands to memory circuit 220 via communication bus 280 and bus clock 282. Bus clock 282 is utilized by memory controller circuit 210 to control a flow of the memory commands to memory circuits 220. A number of cycles of bus clock 228 (referred to herein as "clock cycles" for brevity) occur between initiating execution of a particular memory request to when the memory request is fulfilled by the generated memory commands. Execution of some memory requests may include idle clock cycles between the individual memory commands used to fulfill a particular memory request. Depending on the memory requests waiting in instruction queue 230, other memory commands may be executed during some or all of these otherwise idle clock cycles. An efficiency of memory controller circuit 210 may be determined based on a ratio, or percentage, of clock cycles actively used to execute memory commands versus a total number of clock cycles occurring over a particular amount of time.

It is noted that the embodiment of FIG. 2 is merely an example for demonstrating the disclosed concepts. The illustrated number of read and write requests is chosen for clarity. In other embodiments, any suitable number of read and write requests may be included in the instruction queue and write request queue.

Referring back to the description of FIG. 1, the memory controller circuit determines a value representing an efficiency of the memory controller. This efficiency may be determined, in some embodiments, by a number of memory commands executed in a particular amount of time.

Figure 3:
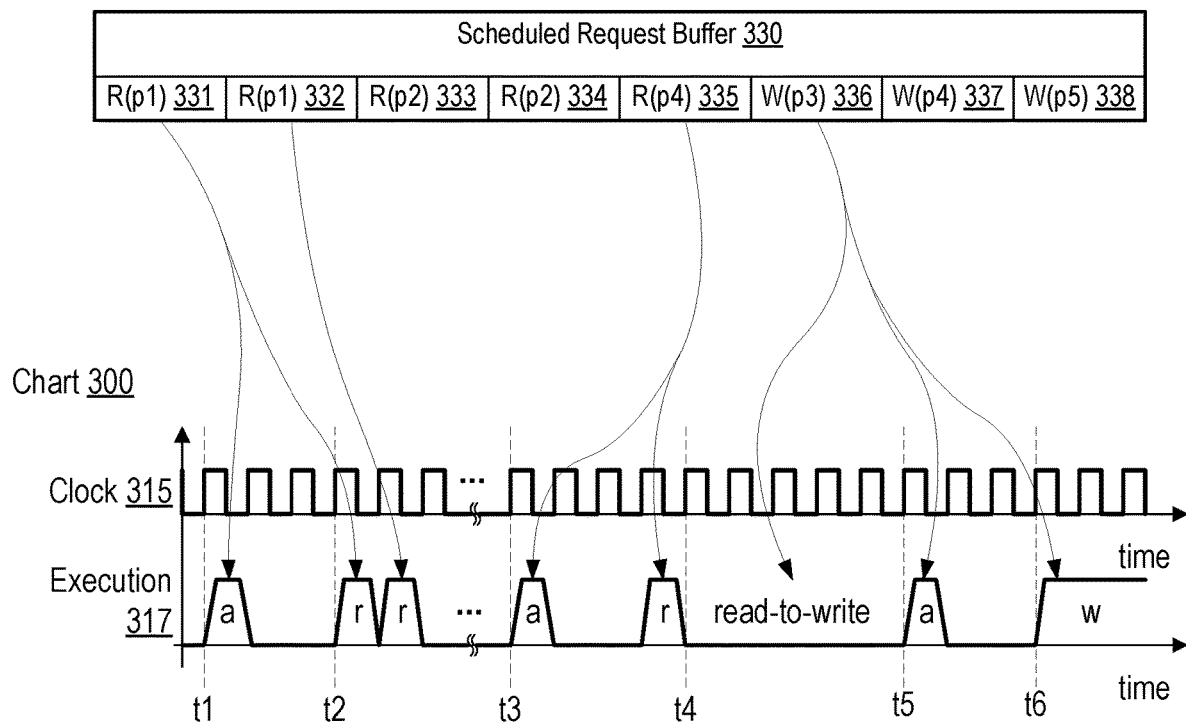
FIG. 3 depicts an embodiment of a scheduled request buffer and a chart representing a timeline for the execution of buffered memory requests.

Turning to FIG. 3, in an example for determining efficiency, an embodiment of a scheduled request buffer and a chart depicting memory command execution versus time are shown. Scheduled request buffer 330, in various embodiments, may correspond to scheduled request buffer 130 in FIG. 1, or to instruction queue 230 in FIG. 2. As shown, scheduled request buffer 330 includes eight entries currently filled with eight respective memory requests 331-338. Each of memory requests 331-338 is either a read request (indicated by the letter "R") or a write request (indicated by the letter "W"). In addition, a memory page indicator is included, indicating which one of a plurality of memory pages (p1-p5) is accessed by the respective request. For example, memory request 333 is a read request for information at a location in memory page 2.

Chart 300, as illustrated, depicts a timeline for executing memory commands corresponding to memory requests 331-338. Clock signal 315 corresponds to clock signal 115 in FIG. 1, and provides a timing reference to a memory controller executing memory requests 331-338, e.g., memory controller circuit 110. Execution signal 317 indicates activity in a command interface between memory controller circuit 110 and a memory circuit, such as, for example, memory circuit 120. A high signal indicates when a memory command is actively being executed, and a low signal indicates when the command interface is idle. It is noted that when the command interface is idle, circuits in the memory controller and in the memory circuit may be actively executing or otherwise processing various memory requests and commands. Several letters are used with execution signal 317 to indicate a type of memory command being executed. An "a" indicates an activation command used to prepare a respective memory page for one or more subsequent read or write commands. An "r" indicates a read command for reading one or more bytes of information from the activated memory page. Similarly, a "w" indicates a write command for writing one or more bytes of information to the activated page.

As previously described, the memory controller executes a memory request by issuing one or more memory commands to the memory circuit, which then executes the individual memory commands, thereby fulfilling the corresponding memory request. Referring to FIG. 3, at time t1 memory request 331 is initiated by executing a page activation command for memory page 1. As shown, the memory circuits utilize several cycles of clock signal 315 until time t2, at which point information from page 1 may be read and sent to the memory controller. Memory request 331 is fulfilled by executing a read command at time t2. In addition, a second read command is executed to fulfill memory request 332 which accesses information on the same memory page. By time t3, memory requests 333 and 334 have been fulfilled. For brevity, depictions of the memory commands for fulfilling memory requests 333 and 334 are omitted. At time t3, memory request 335 is initiated by executing an activation command for page 4, and information is read several cycles of clock signal 315 later.

Memory circuit 120, as illustrated, is configured to a read state for read commands or a write state for write commands, and several cycles of clock signal 315 are used to reconfigure memory circuit 120 from a read state to a write state. During this transition, memory read, write, and activate commands are not issued to memory circuit 120. Between times t4 and t5, a read state to write state transition is performed. This read-to-write transition may end a read turn that includes memory requests 331-335, and prepare memory circuit 120 for a write turn that includes memory requests 336-338.

At time t5, memory circuit 120 is in a write state and executes a memory page activation to prepare page 3 for a write command. Several cycles of clock signal 315 later, at time t6, page 3 is ready to receive data as part of memory request 336. Write commands to memory circuit 120, as shown, may differ from read commands. Whereas a read command may read a subset of memory locations on an activated page, a write command may, in some embodiments, write to all locations in an activated page. Write commands, therefore, may consume more time to complete due to more information being sent from memory controller circuit 110 to memory circuit 120.

Memory controller circuit 110 and memory circuit 120 may continue to fulfill memory requests 337 and 338 after request 336 completes. Memory controller circuit 110 may determine a current memory access efficiency in response to the completion of the read turn and the write turn. The current memory access efficiency is determined based on a ratio of clock cycles used to process memory requests to total clock cycles that occurred during the completed read and write turns. For example, a particular read turn may include 48 read requests and the subsequent write turn may include 16 write requests. To fulfill these 64 memory requests may take 150 cycles of clock signal 315. During these 150 cycles, execution signal 317 may indicate activity for 45 cycles, resulting in a ratio of 0.30 or a 30% current memory access efficiency. Memory controller circuit 110 may include a specified memory access efficiency that is set during a design of memory controller circuit 110, or set by software, such as, for example, an operating system executing in a computer system that includes memory controller circuit 110. The current memory access efficiency value of 30% is compared to this specified memory access efficiency value, for example, 90%, thereby determining that memory controller circuit 110 is operating below the specified goal. Based on this comparison, memory controller circuit 110, may modify one or more techniques for future memory request turns. For example, memory controller circuit 110 may modify a number of memory requests included in subsequent memory request turns. Additional details are provided later in this disclosure.

It is noted that the embodiment of FIG. 3 is an example. FIG. 3 is simplified to clearly disclose features of the embodiment. In other embodiments, additional commands may be executed to fulfill a read or write request. In some embodiments, the order of memory commands may differ. A number of clock cycles used to complete a particular memory command may be different than shown in FIG. 3.

In the description of FIG. 3, the memory controller is disclosed as adjusting a number of memory requests included in subsequent memory request turns in response to a comparison of a current memory access efficiency to a specified memory access efficiency. Proceeding to FIG. 4, several tables representing a scheduled request buffer are used to illustrate an example of such adjustments. Scheduled request buffer 430a depicts a state of a scheduled request buffer, such as, for example, scheduled request buffer 130 in FIG. 1, at a first point in time. Scheduled request buffers 430b and 430c depict possible states of the scheduled request buffer at a later point in time in response to two different values of a current memory access efficiency, 431b and 431c.

Scheduled request buffer 430a depicts a state of a scheduled request buffer with a read turn and a write turn, each with 32 respective memory requests. Once the scheduled requests are performed at the end of the read and write turns, a memory controller circuit, such as, for example, memory controller circuit 110 in FIG. 1, determines a current memory access efficiency, as described above. Memory controller circuit 110 may modify a number of memory requests to be executed in subsequent read and write turns based on a comparison of the current memory access efficiency to a specified memory access efficiency.

As a first example, memory controller circuit 110 determines a value of 60% for current memory access efficiency 431b. If a specified memory access efficiency is 85%, then memory controller circuit 110 may adjust the number of memory requests included in subsequent read and write turns. Such a case may occur if the read requests are accessing different memory pages on one or two memory banks on a single memory device, thereby limiting a number of read requests that may be performed concurrently. Queued write requests, in contrast, may straddle a variety of memory devices, thereby enabling concurrent execution of multiple write requests. As shown in scheduled request buffer 430b, memory controller circuit 110 reduces a number of read requests in the read turn to 20 and increases a number of write requests in the write turn to 40. It is noted that, in addition to modifying the number of requests in each of the read and write turns, a total number of memory requests is modified for the combined memory request turn.

In a second example, memory controller circuit 110 determines a value of 95% for current memory access efficiency 431c. Assuming a same specified memory access efficiency of 85%, then memory controller circuit 110 may again adjust the number of memory request in each of the read and write turns. Assuming a similar mix of read requests and write requests as before, memory controller circuit 110 increases a number of read requests in the read turn to 48 and reduces the number of write requests in the write turn to 16. Due to the higher value of memory access efficiency 431c, memory controller circuit 110 has margin to execute some of the read requests that have limited opportunity for being performed concurrently. By tracking a current memory access efficiency and comparing to a specified memory access efficiency, the memory controller circuit may modify a number of memory requests in the read and write turns to attain the specified efficiency.

Figure 4:
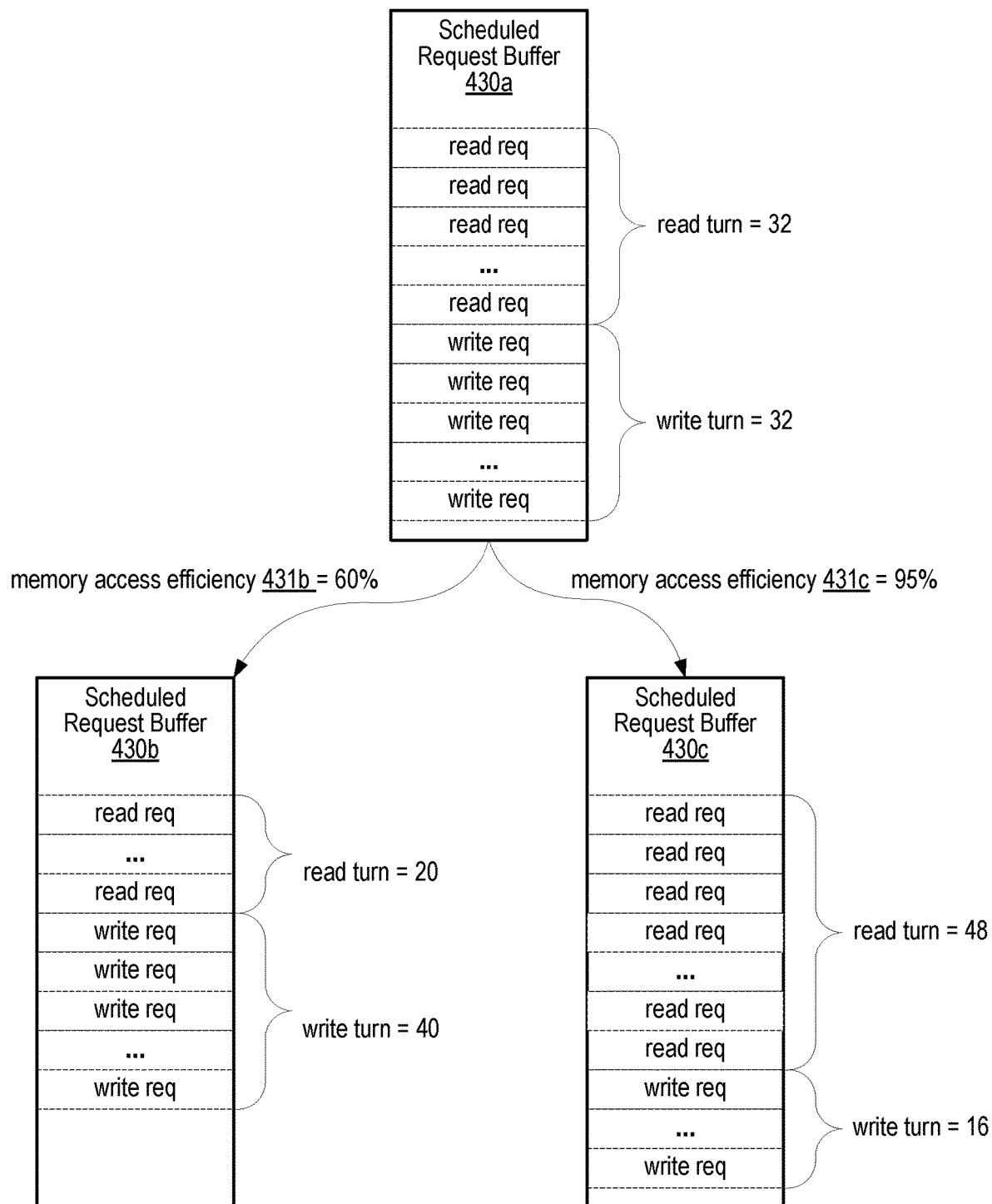
FIG. 4 presents three tables representing different states of a scheduled request buffer.

It is noted that the depictions in FIG. 4 are merely examples. In other embodiments, different numbers of memory requests may be included in the read and write turns. Although only read and write requests are illustrated, in other embodiments, other types of memory requests may be included, such as partial read requests.

Figure 5:
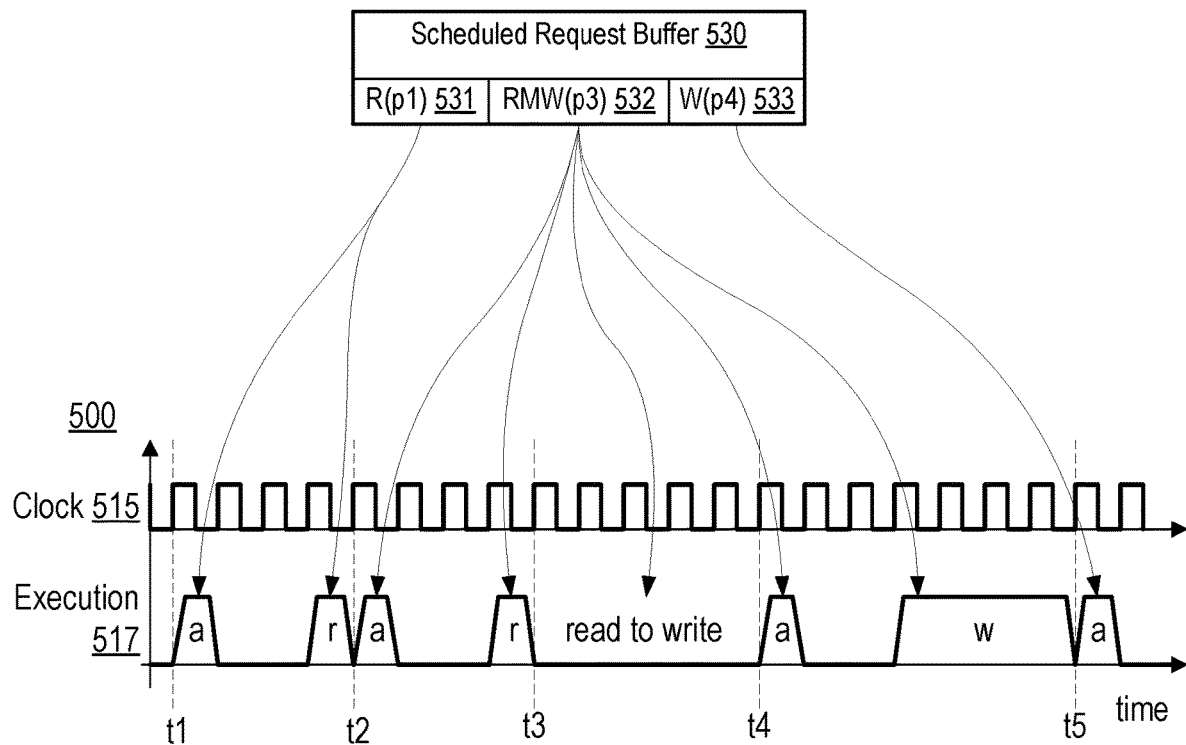
FIG. 5 illustrates another embodiment of a scheduled request buffer and a corresponding chart depicting a timeline for the execution of buffered memory requests.

Moving now to FIG. 5, an example of scheduling a read-modify-write memory request is shown. Scheduled request buffer 530, may correspond to scheduled request buffer 130 in FIG. 1, or to instruction queue 230 in FIG. 2. Scheduled request buffer 530 is shown with three entries currently filled with three respective memory requests 531-533. Memory request 531 is a read request (R) for memory page 1 (p1). Memory request 533 is a write request (W) for memory page 4 (p4). In addition, memory request 532 is a partial read (i.e., a read-modify-write) request (RMW) for page 3 (p3). Referring collectively to FIG. 1 and scheduled request buffer 530, the three memory requests 531-533 are executed according to the timeline of chart 500.

Chart 500, as illustrated, depicts a timeline for executing memory commands corresponding to the three memory requests 531-533. Clock signal 515 corresponds to clock signal 115, and provides a timing reference to memory controller circuit 110. Execution signal 517 indicates activity in a command interface between memory controller circuit 110 and memory circuit 120. A high portion of the signal indicates when a memory command is actively being executed, and a low portion of the signal indicates when the command interface is idle. Similar to chart 300 in FIG. 3, several letters are used with execution signal 317 to indicate a type of memory command being executed. An "a" indicates an activation command used to prepare a respective memory page for one or more subsequent read or write commands. An "r" indicates a read command for reading one or more bytes of information from the activated memory page. Similarly, a "w" indicates a write command for writing one or more bytes of information to the activated page.

As shown, read request 531 is a last read request in a read turn, and write request 533 is a first write request in a subsequent write turn. Memory controller circuit 110 schedules partial write request 532 to be performed between the end of the read turn and the start of the write turn. A partial write request is a type of read-modify-write request that includes reading information from a specified page, modifying, if necessary, some or all of the data from the specified page, and then writing the modified data back to the specified page. Since both read and write commands are executed to fulfill this type of memory request, a read-to-write transition is performed between the read and write commands. As is described below, scheduling a read-modify-write request between a read turn and a write turn may allow memory circuit 120 to avoid executing a read-to-write transition specifically for the read-modify-write request.

Between times t1 and t2, two memory commands, a page activation command and a read command, are executed to fulfill read request 531. Between time t2 and t3, a page activation command and a read command are executed to fulfill a read portion of memory request 532, resulting in the specified page 3 being read by memory controller circuit 110. After the data from page 3 is read, memory controller circuit 110 initiates a read-to-write transition for memory circuit 120 from time t3 to time t4. During the transition time, memory controller circuit 110 may make any necessary changes to the data from page 3 as specified in memory request 532. After memory circuit 120 is in a write state, the write portion of memory request 532 is fulfilled between times t4 and t5. Since memory circuit 120 is now in a write state, write request 533 may begin at time t5 without a need for further state transitions.

It is noted that if read-modify-write request 532 is scheduled during a read turn, then a write-to-read transition would be needed after request 532 is fulfilled, to return memory circuit 120 to a read state to complete the read turn. Likewise, if read-modify-write request 532 is scheduled during a write turn, then a write-to-read transition would be needed before request 532 begins, to put memory circuit 120 into a read state for the first read portion of the request.

It is also noted that FIG. 5 is an example for demonstrating disclosed concepts. The timeline in chart 500 is simplified for clarity. In other embodiments, any suitable number of clock cycles may occur during and between the illustrated activity.

Circuits and charts related to scheduling and execution of memory requests have been presented above. Two methods for operating such circuits are now presented.

Figure 6:
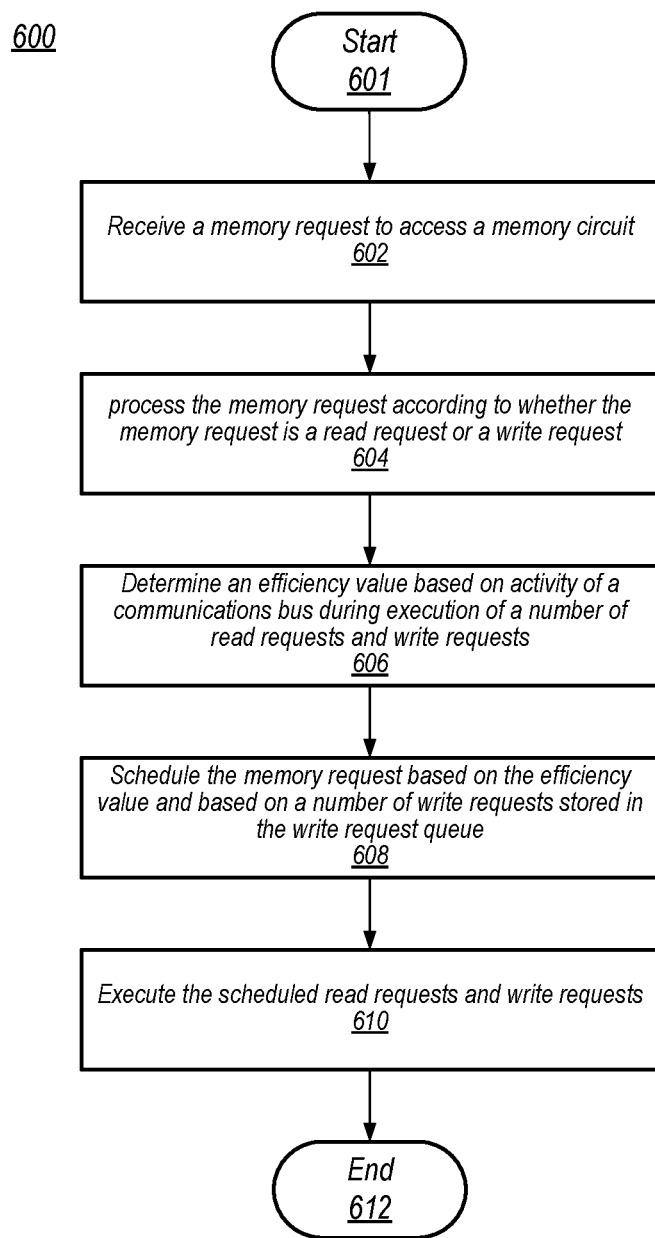
FIG. 6 shows a flow diagram of an embodiment of a method for scheduling memory requests by a memory controller circuit.

Turning now to FIG. 6, a flow diagram illustrating an embodiment of a method for managing memory requests in a memory controller is shown. Method 600 may be applied to a memory controller circuit, such as, for example, memory controller circuit 110 in FIG. 1 or memory controller circuit 210 in FIG. 2. Referring collectively to FIG. 1 and the flow diagram of FIG. 6, the method may begin in block 601.

A memory controller receives a memory request to access a memory circuit (block 602). The memory controller, e.g., memory controller circuit 110, receives a memory request from one or more processing circuits within a computing system that includes memory controller circuit 110 and memory circuit 120. A processing circuit may issue a memory request to retrieve information from memory circuit 120, for example, an instruction or operand for program code of an application or other software process that is currently executing in a processing circuit in the computing system. In other cases, a processing circuit may issue a memory request to store information into memory circuit 120 for later use. Memory controller 110, as shown in FIG. 1, includes a write request queue and a scheduled request buffer.

The memory controller processes the memory request according to whether the memory request is a read request or a write request (block 604). Memory controller circuit 110 determines if the memory request includes a read request or a write request. In some embodiments, additional types of memory requests may be received, such as, for example, read-modify-write commands. Memory accesses may take several cycles of a clock signal (e.g., clock signal 115) and therefore, memory controller circuit 110 may be configured to schedule received memory requests in such a fashion as to fulfill the memory requests at an efficient rate. Since a read request may include a request for an instruction or operand for an application, a speed with which such read requests are fulfilled, may have a direct impact on a perceived performance of the computing system by a user of the computing system. Therefore, scheduling read requests may be prioritized over scheduling write requests. The received read request may be scheduled within scheduled request buffer 130 within a group of other read requests as part of a read turn. Write requests may have a lower priority than read requests since write requests may not be in a critical path for code execution. Memory controller circuit 110 may, therefore, store the received write request in write request queue 140.

The memory controller determines an efficiency value representing a current efficiency of the memory controller executing memory requests (block 606). After executing a number of memory requests, memory controller circuit 110 determines a value for a current memory access efficiency associated with the execution of the memory commands included in the most recent read and write turns. The efficiency value may be determined based on a ratio of active clock cycles to total clock cycles of bus clock 282, shown in FIG. 2, during the completed read and write turns. Active clock cycles refers to cycles of bus clock 282 used to process memory requests. A total number of cycles refers to a number of cycles of bus clock 282 that occur from the beginning of execution of the first request of the read turn to the completion of the last request of the write turn. In other embodiments, the efficiency value may be based on the number of memory requests in the read and write turns, divided by the total number of cycles.

The memory controller schedules the memory request based on the efficiency value and based on a number of write requests stored in the write request queue (block 608). Memory controller circuit 110 compares the determined value of the current memory access efficiency to a specified memory access efficiency value. This specified value may be set during a design of memory controller circuit 110 or may be sent to memory controller circuit 110 by an operating system or other software running on the computing system. Memory controller circuit 110 schedules the memory request within an appropriate upcoming read or write turn. For the upcoming read and write turn, memory controller circuit 110 may also adjust a number of read requests and/or a number of write requests to be included in subsequent read and write turns. For example, if a number of write requests in write request queue 140 is less than threshold 141, then a received write request is stored in write request queue 140 rather than being scheduled for processing. Otherwise, if the number of requests in write request queue 140 is reaches threshold 141, then one or more write requests currently stored in write request queue 140 may be scheduled in the upcoming write turn for execution.

The memory circuit executes the scheduled read requests and write requests (block 610). To execute the scheduled memory requests, memory controller circuit 110 sends one or more memory commands corresponding to each request to memory circuit 120. Memory circuit 120 executes the memory commands corresponding to the scheduled read and write requests. The method ends in block 614.

It is noted that the method illustrated in FIG. 6 is an example for demonstrating the disclosed concepts. In other embodiments, operations may be performed in a different sequence. Additional operations may also be included, such as, for example, comparing a current queued number of write requests to a threshold number.

Figure 7:
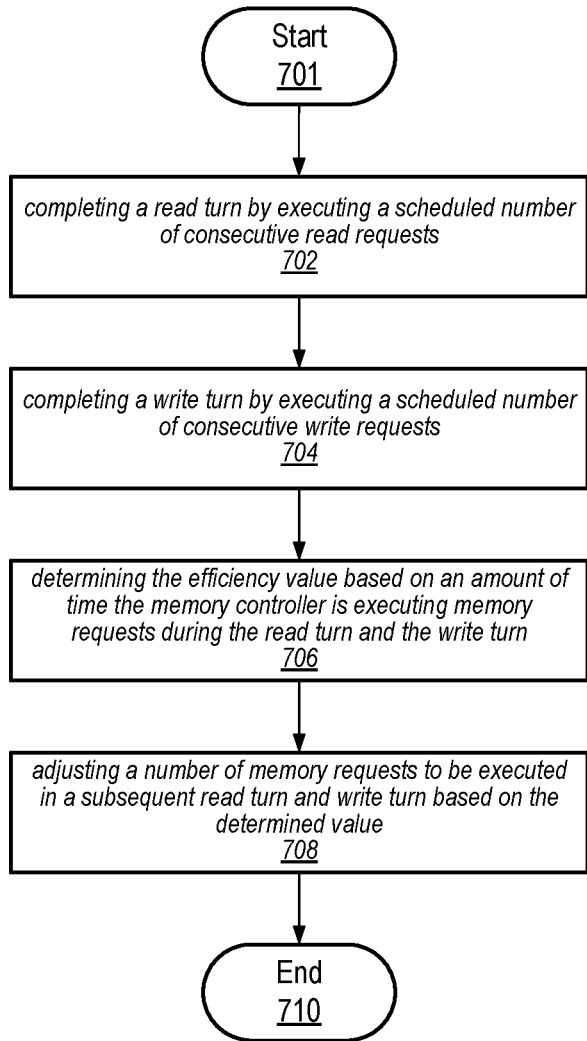
FIG. 7 presents a flow diagram of an embodiment of a method for determining an efficiency value corresponding to execution of memory requests.

Proceeding now to FIG. 7, a flow diagram illustrating an embodiment of a method for determining and utilizing an efficiency value by a memory controller is shown. Method 700, similar to method 600 above, may be applied to a memory controller circuit, such as, e.g., memory controller circuit 110 in FIG. 1 or memory controller circuit 210 in FIG. 2. The operations disclosed by method 700 may be performed in conjunction with or as a part of method 600. Referring collectively to FIG. 1 and the flow diagram of FIG. 7, the method may begin in block 701.

A memory controller completes a read turn by executing a scheduled number of consecutive read requests (block 702). Memory controller circuit 110, as described above, creates a group of received read requests to form a read turn. The requests of the read turn are executed in a particular order without a write request being executed before the last read requests of the read turn has completed. The particular order may include executing some read requests serially, while some may be executed concurrently, such as executing two read requests in parallel that address different memory banks or different memory devices.

The memory controller completes a write turn by executing a scheduled number of consecutive write requests (block 704). Similar to block 702, memory controller circuit 110, as described above, creates a group of write requests to form a write turn using write requests that have been queued to write request queue 140. As with the requests of the read turn, requests of the write turn may be executed in a particular order without a read request being executed before the last write request of the write turn has completed. The particular order for the write requests may also include executing some write requests serially, while some may be executed concurrently, as is suitable.

In response to completing a read turn and a write turn, the memory controller determines the efficiency value based on an amount of time the memory controller is executing memory requests during the read turn and the write turn (block 706). After executing memory requests for a read turn and a subsequent write turn, memory controller circuit 110 determines a current memory access efficiency value. This efficiency value, for example, may be based on a percentage of cycles of clock signal 115 that occurred during execution of memory commands associated with the memory requests in the read and write turns, out of a total number of cycles occurring from the beginning of execution of the first request of the read turn to the completion of the last request of the write turn.

The memory controller adjusts a number of memory requests to be executed in a subsequent read turn and write turn based on the determined value (block 708). Memory controller circuit 110 compares the determined current memory access efficiency value to a specified memory access efficiency value. Based on this comparison, memory controller circuit 110 may adjust a number of read and/or write requests that are scheduled in subsequent read and write turns. Under some circumstances, the number of read request in a read turn or the number of write requests in a write turn (but not both) may be zero. The method ends in block 710.

It is noted that method 700 is one example related to managing memory requests. Operations may be performed in a different order in other embodiments. Some embodiments may include additional operations, such as, for example, including a read-to-write transition between the read and write turns.

Figure 8:
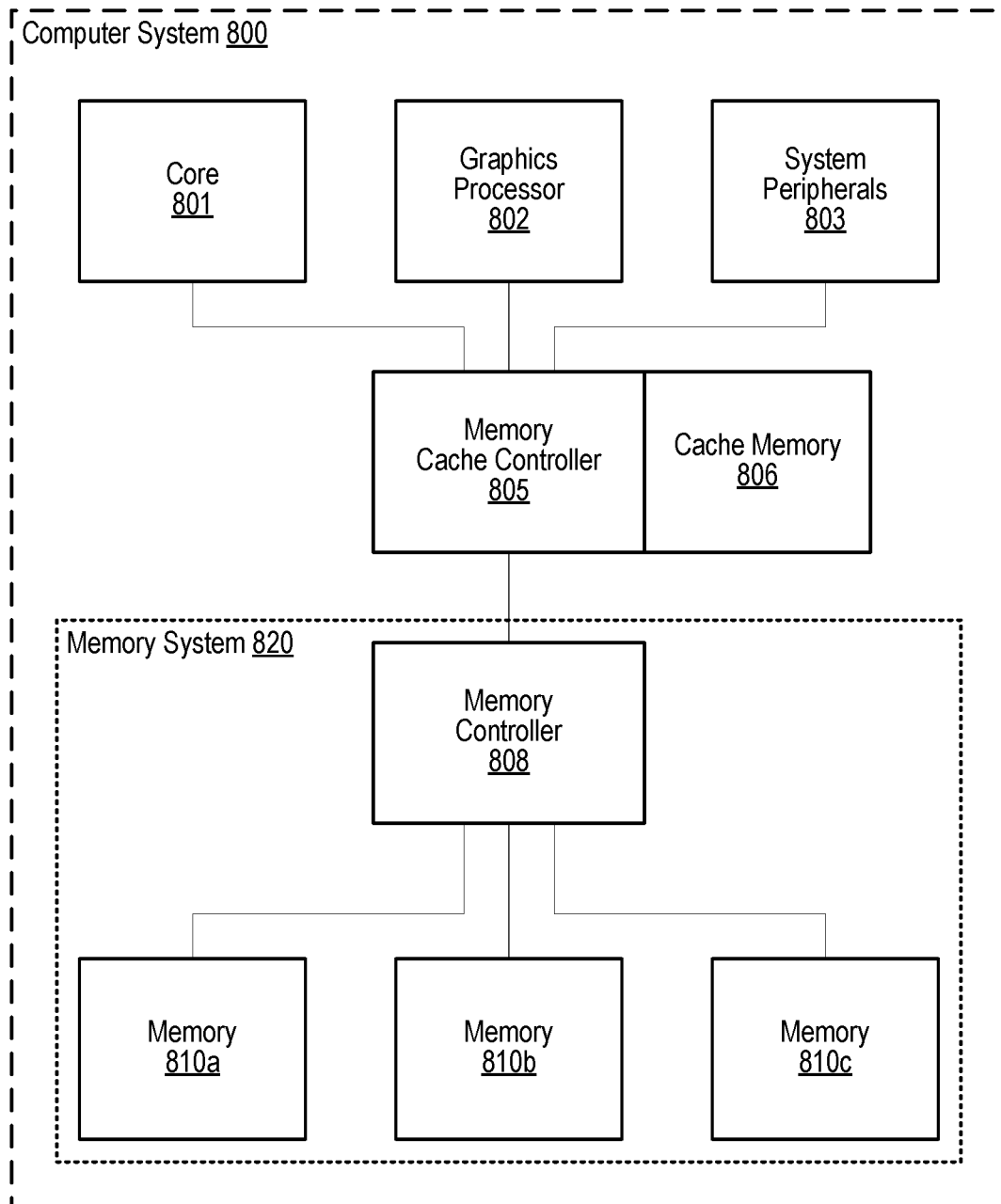
FIG. 8 depicts a block diagram of an embodiment of a computer system.

A block diagram of an embodiment of a computer system, such as, for example, a system-on-chip (SoC), is illustrated in FIG. 8. Computer system 800 may be representative of a system that includes a memory controller circuit and memory circuit, and that utilizes the concepts disclosed above. Computer system 800, in various embodiments, may be a system implemented on one or more circuit boards, including a plurality of integrated circuits, or may be an SoC integrated onto a single computer chip, or may be implemented as a combination thereof. Computer system 800 includes several processing cores, including core 801, graphics processor 802, and system peripherals 803, all coupled to memory cache controller 805. Memory cache controller 805 is coupled to cache memory 806 and to memory controller circuit 808. Memory controller circuit 808 is coupled to memories 810*a*-810*c*. Collectively, memory controller 808 and memories 810*a*-810*c* form memory system 820, which, in some embodiments, corresponds to memory system 100 in FIG. 1.

In the illustrated embodiments, core 801 is representative of a general-purpose processing core that performs computational operations. Although a single processing core, i.e., core 801, is illustrated, in some embodiments core 801 may correspond to a core complex that includes any suitable number of processing cores. In various embodiments, core 801 may implement any suitable instruction set architecture (ISA), such as, e.g., ARM™, PowerPC®, Blackfin®, or x86 ISAs, or combination thereof. Core 801 may execute instructions and utilize data stored in memories located outside of computer system 800, such as, for example, memories 810*a*-810*c*, by issuing memory transactions to fetch the instructions and data to be utilized. Data and instructions fetched from memories 810*a*-810*c* may be cached in cache memory 806. In some embodiments, core 801 may include one or more cache memories in addition to cache memory 806.

Graphics processor 802, in the illustrated embodiment, includes circuitry for processing images or video to be sent to a display screen (not shown). In some embodiments, images and/or videos to be processed by graphics processor 802 may be stored in memories 810*a*-810*c*. Memories 810*a*-810*c* may also store graphics processing instructions for use by graphics processor 802 to generate the images. Graphics processor 802 may correspond to a processing core capable of issuing memory transactions to retrieve graphics data and instructions. Data retrieved from memories 810*a*-810*c* may be cached in cache memory 806.

In the illustrated embodiment, system peripherals 803 includes one or more circuit blocks for performing any number of suitable tasks. For example, in various embodiments, system peripherals 803 may include any one or more of communication peripherals (e.g., universal serial bus (USB), Ethernet), encryption engines, audio processors, direct memory access modules, or any other peripheral that may generate memory transactions to retrieve data or commands from memories 810*a*-810*c*. System peripherals 803 may include one or more processing cores within the various functional circuits that are capable of issuing memory transactions to memory cache controller 805.

In the illustrated embodiment, memory cache controller 805 includes circuits for managing memory transactions issued by core 801, graphics processor 802, and system peripherals 803. In the illustrated embodiment, memory cache controller 805 decodes memory transactions, translates addresses, and determines if valid content corresponding to the addressed location is currently in cache memory 806, or if this data is to be fetched from memories 810*a*-810*c* or elsewhere. If valid content is not currently cached in cache memory 806, then memory cache controller 805 may send the transaction to memory controller circuit 808 to fetch the requested data. In some embodiments, computer system 800 may include more than one cache memory 806 and may, therefore, include a respective memory cache controller 805 for each cache memory 806.

In some embodiments, memory controller circuit 808 may, correspond to memory cache controller 110 in FIG. 1. Memory controller circuit 808 may include one or more memory controller circuits for fulfilling memory transactions from each of memories 810*a*-*c*. For example, one memory controller circuit may be included for each of memories 810*a*-810*c*. In the illustrated embodiment, memory controller circuit 808 includes circuits used to read and write data to each of memories 810*a*-810*c*. Memory controller circuit 808 receives memory transactions from memory cache controller 805 if valid content corresponding to the transaction's address is not currently stored in cache memory 806.

Memories 810*a*-810*c* are storage devices that collectively form at least a portion of memory hierarchy that stores data and instructions for computer system 800. More particularly, memories 810*a*-810*c* may correspond to volatile memory with access times less than a non-volatile memory device. Memories 810*a*-810*c* may therefore be used to store instructions and data corresponding to an operating system and one or more applications read from a non-volatile memory after a system boot of computer system 800. Memories 810*a*-810*c* may be representative of memory devices in the dynamic random access memory (DRAM) family of memory devices or in the static random access memory (SRAM) family of memory devices, or in some embodiments, a combination thereof.

It is also noted that, to improve clarity and to aid in demonstrating the disclosed concepts, the diagram of computer system 800 illustrated in FIG. 8 has been simplified. In other embodiments, different and/or additional circuit blocks and different configurations of the circuit blocks are possible and contemplated.

Figure 9:
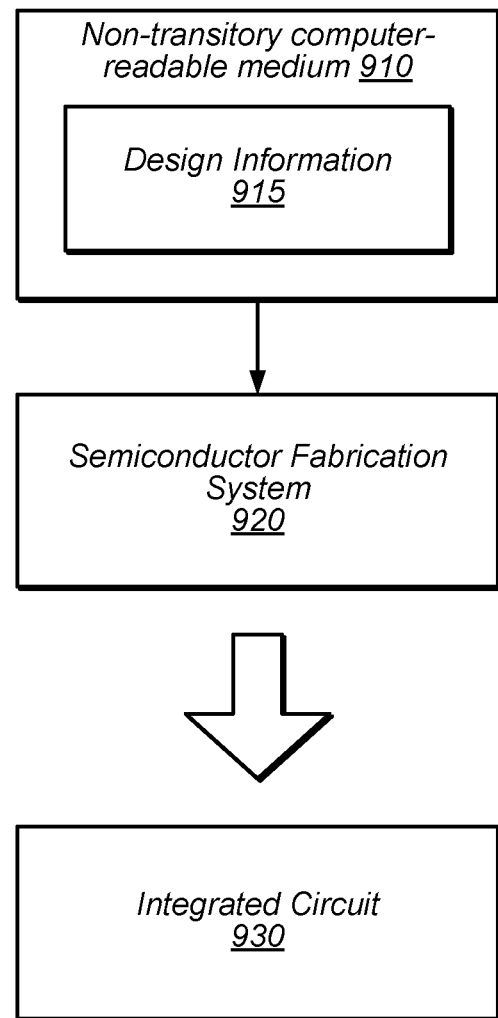
FIG. 9 illustrates a block diagram depicting an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, such as, for example, an IC that includes computer system 800 of FIG. 8. In the illustrated embodiment, semiconductor fabrication system 920 is configured to process the design information 915 stored on non-transitory computer-readable storage medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a memory circuit; and
   a memory controller circuit, including a write request queue, configured to:
      schedule a first set of memory accesses that includes a read turn and a write turn, wherein the first set is scheduled to consecutively execute a first number of read accesses in the read turn and to consecutively execute a second number of write accesses in the write turn, wherein the first number and the second number are determined based on a memory access efficiency of the memory circuit;
      update the memory access efficiency based on memory activity during the first set of memory accesses; and
      adjust, based on the updated memory access efficiency, the first number and the second number, wherein the adjusted first and second numbers indicate, respectively, how many read accesses and write accesses are performed in a second, subsequent set of memory accesses that includes another read turn and another write turn.

2. The apparatus of claim 1, wherein the memory controller circuit is further configured to increase the memory access efficiency by increasing the first number and decreasing the second number.

3. The apparatus of claim 1, wherein the memory controller circuit is further configured to increase the memory access efficiency by scheduling a plurality of read accesses to a common memory page in the memory circuit.

4. The apparatus of claim 1, wherein the memory controller circuit includes a bus clock signal, and wherein to determine the updated memory access efficiency, the memory controller circuit is further configured to determine a number of bus clock cycles that are used to process memory requests during the read and write turns.

5. The apparatus of claim 1, wherein the memory controller circuit is further configured to schedule the write turn in response to a determination that a total number of write requests in the write request queue satisfies a threshold value.

6. The apparatus of claim 1, wherein the memory controller circuit is further configured to schedule at least one partial write memory request to be executed between the read turn and the write turn.

7. The apparatus of claim 1, wherein the memory controller circuit is further configured to select a particular write request over a different write request for inclusion in the first set of memory accesses in response to a determination that an amount of data to be stored by the particular write request is larger than an amount of data to be stored by the different write request.

8. A method comprising:
completing, by a memory controller circuit, a read turn by executing a first number of scheduled consecutive read requests;
completing, by the memory controller circuit, a write turn by executing a second number of scheduled consecutive write requests;
determining, by the memory controller circuit, an efficiency value based on an amount of time the memory controller circuit is executing memory requests during the read turn and the write turn; and
adjusting, by the memory controller circuit, the first and second numbers for a subsequent read turn and write turn based on the determined efficiency value.

9. The method of claim 8, wherein determining the efficiency value includes determining a number of idle bus clock cycles occurring during the completing of the read and write turns.

10. The method of claim 8, further comprising comparing a current efficiency value to a specified efficiency value, and wherein adjusting the first and second numbers includes adjusting the first and second numbers based on the comparing.

11. The method of claim 10, wherein adjusting the first and second numbers based on the comparing includes increasing the first number and decreasing the second number to increase the efficiency value.

12. The method of claim 10, wherein adjusting the first and second numbers based on the comparing includes increasing the second number and decreasing the first number to decrease a number of write requests stored in a write request queue.

13. The method of claim 10, further comprising adjusting the specified efficiency value based on current processing requirements.

14. An apparatus comprising:
a write request queue;
an instruction queue;
a communication bus configured to send memory requests to a memory circuit; and
an arbitration circuit configured to:
store received write requests into the write request queue;
based on a current value of a memory access efficiency:
schedule a read turn by placing a first consecutive number of received read requests into the instruction queue; and
schedule a write turn by moving a second number of consecutive write requests from the write request queue to the instruction queue;
determine an updated value of the memory access efficiency based on an activity of the communication bus during execution of the read turn and the write turn; and
adjust the first and second numbers to be scheduled in subsequent read and write turns based on the updated value.

15. The apparatus of claim 14, wherein the arbitration circuit is further configured to schedule the write turn in response to a determination that a total number of write requests in the write request queue satisfies a threshold value.

16. The apparatus of claim 15, wherein the second number is less than the total number of write requests.

17. The apparatus of claim 15, wherein the threshold value is adjusted using the updated value.

18. The apparatus of claim 15, wherein the arbitration circuit is further configured, in response to a determination that the total number of write requests in the write request queue does not satisfy the threshold value, schedule a subsequent write turn by moving zero write requests from the write request queue to the instruction queue.

19. The apparatus of claim 14, wherein the communication bus includes a bus clock signal, and wherein to determine the updated value of the memory access efficiency, the arbitration circuit is further configured to determine a number of idle bus clock cycles occurring during the read and write turns.

20. The apparatus of claim 14, wherein the arbitration circuit is further configured to increase the memory access efficiency by increasing the first number and decreasing the second number.

* * * * *